United States Patent
van Dijk et al.

(10) Patent No.: US 8,819,769 B1
(45) Date of Patent: Aug. 26, 2014

(54) MANAGING USER ACCESS WITH MOBILE DEVICE POSTURE

(75) Inventors: Marten van Dijk, Somerville, MA (US); Kevin D. Bowers, Melrose, MA (US); Samuel Curry, Andover, MA (US); Sean P. Doyle, Edmonds, WA (US); Eyal Kolman, Tel Aviv (IL); Nikolaos Triandopoulos, Arlington, MA (US); Riaz Zolfonoon, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 82 days.

(21) Appl. No.: 13/435,606

(22) Filed: Mar. 30, 2012

(51) Int. Cl.
*H04L 29/06* (2006.01)

(52) U.S. Cl.
USPC ........... 726/1; 726/23; 726/25; 726/9; 726/10

(58) Field of Classification Search
USPC ........................................ 726/1, 9, 10, 23, 25
See application file for complete search history.

(56) References Cited

U.S. PATENT DOCUMENTS

| 7,194,763 | B2 * | 3/2007 | Potter et al. ........................ 726/7 |
| 7,409,476 | B1 * | 8/2008 | Liang et al. ...................... 710/52 |
| 7,512,970 | B2 * | 3/2009 | Naftali et al. ...................... 726/4 |
| 7,587,751 | B2 * | 9/2009 | Potter et al. ........................ 726/2 |
| 7,703,126 | B2 * | 4/2010 | Khosravi et al. .................... 726/2 |
| 7,714,697 | B2 * | 5/2010 | Soleimani et al. ........... 340/10.2 |
| 7,739,724 | B2 * | 6/2010 | Durham et al. .................... 726/3 |
| 7,805,512 | B2 * | 9/2010 | Khosravi ...................... 709/225 |
| 7,886,065 | B1 * | 2/2011 | Satish et al. .................. 709/229 |
| 7,904,946 | B1 | 3/2011 | Chu |
| 7,987,495 | B2 * | 7/2011 | Maler et al. ........................ 726/1 |
| 7,990,974 | B1 * | 8/2011 | Gmuender et al. ........... 370/392 |
| 8,085,662 | B2 * | 12/2011 | Hiscock ........................ 370/230 |
| 8,132,233 | B2 * | 3/2012 | Gronholm et al. ................. 726/3 |
| 8,205,238 | B2 * | 6/2012 | Blumenthal et al. .............. 726/1 |
| 8,370,389 | B1 * | 2/2013 | Dotan ........................... 707/784 |
| 8,478,708 | B1 * | 7/2013 | Larcom ........................... 706/52 |
| 8,510,803 | B2 * | 8/2013 | Gronholm et al. ................. 726/3 |
| 8,533,460 | B2 | 9/2013 | Hird |
| 2002/0144128 | A1 | 10/2002 | Rahman |
| 2003/0163739 | A1 | 8/2003 | Armington |
| 2004/0172535 | A1 | 9/2004 | Jakobsson |
| 2004/0228503 | A1 | 11/2004 | Cutler |
| 2005/0071635 | A1 | 3/2005 | Furuyama |
| 2006/0026670 | A1 * | 2/2006 | Potter et al. ........................ 726/7 |
| 2006/0026671 | A1 * | 2/2006 | Potter et al. ........................ 726/7 |
| 2007/0022196 | A1 | 1/2007 | Agrawal |
| 2007/0156858 | A1 * | 7/2007 | Sood et al. .................... 709/220 |

(Continued)

FOREIGN PATENT DOCUMENTS

WO  2009/001020 A1  12/2008

OTHER PUBLICATIONS

Juels et al., "Key Update With Compromise Detection," U.S. Appl. No. 13/250,225, filed Sep. 30, 2011.

*Primary Examiner* — David García Cervetti
(74) *Attorney, Agent, or Firm* — BainwoodHuang (57) ABSTRACT

An improved technique for managing access of a user of a computing machine to a remote network collects device posture information about the user's mobile device. The mobile device runs a soft token, and the collected posture information pertains to various aspects of the mobile device, such as the mobile device's hardware, software, environment, and/or users, for example. The server applies the collected device posture information along with token codes from the soft token in authenticating the user to the remote network.

22 Claims, 7 Drawing Sheets

(56) References Cited

U.S. PATENT DOCUMENTS

| | | |
|---|---|---|
| 2007/0234402 A1* | 10/2007 | Khosravi et al. .................. 726/2 |
| 2007/0240197 A1* | 10/2007 | Blumenthal et al. .............. 726/1 |
| 2008/0005359 A1* | 1/2008 | Khosravi et al. ............. 709/250 |
| 2008/0022354 A1* | 1/2008 | Grewal et al. ..................... 726/1 |
| 2008/0141037 A1 | 6/2008 | Cheston |
| 2008/0148340 A1* | 6/2008 | Powell et al. ..................... 726/1 |
| 2008/0155649 A1* | 6/2008 | Maler et al. ....................... 726/1 |
| 2008/0168544 A1* | 7/2008 | von Krogh ........................ 726/6 |
| 2008/0189764 A1* | 8/2008 | Gronholm et al. ............... 726/3 |
| 2008/0261560 A1 | 10/2008 | Ruckart |
| 2008/0271109 A1* | 10/2008 | Singh et al. ....................... 726/1 |
| 2009/0158302 A1* | 6/2009 | Nicodemus et al. .......... 719/328 |
| 2009/0158409 A1* | 6/2009 | Khosravi .......................... 726/6 |
| 2009/0205036 A1 | 8/2009 | Slaton |
| 2009/0285091 A1* | 11/2009 | Hiscock ........................ 370/230 |
| 2010/0162356 A1* | 6/2010 | Khosravi et al. .................. 726/2 |
| 2010/0180328 A1 | 7/2010 | Moas |
| 2010/0275010 A1 | 10/2010 | Ghirardi |
| 2010/0299731 A1* | 11/2010 | Atkinson .......................... 726/6 |
| 2011/0153496 A1* | 6/2011 | Royyuru ......................... 705/44 |
| 2011/0153854 A1* | 6/2011 | Chickering .................. 709/229 |
| 2011/0154467 A1* | 6/2011 | Bomar et al. ..................... 726/9 |
| 2012/0069770 A1* | 3/2012 | Hiscock ........................ 370/254 |
| 2012/0102212 A1* | 4/2012 | Sood et al. .................... 709/229 |
| 2012/0117622 A1* | 5/2012 | Gronholm et al. ............... 726/3 |
| 2012/0129503 A1 | 5/2012 | Linderman |
| 2012/0167186 A1* | 6/2012 | Dietrich ............................ 726/6 |
| 2012/0173425 A1* | 7/2012 | Jeong ............................. 705/44 |
| 2012/0214443 A1* | 8/2012 | Daigle ........................... 455/411 |
| 2012/0216239 A1* | 8/2012 | Yadav et al. ...................... 726/1 |
| 2012/0246079 A1 | 9/2012 | Wilson |
| 2012/0260093 A1* | 10/2012 | Benson et al. ................ 713/170 |
| 2012/0297456 A1 | 11/2012 | Rose |
| 2012/0311322 A1* | 12/2012 | Koyun et al. .................. 713/156 |
| 2013/0097660 A1 | 4/2013 | Das |
| 2013/0133055 A1 | 5/2013 | Ali |
| 2013/0194223 A1 | 8/2013 | Ward |
| 2013/0268444 A1* | 10/2013 | Namgoong et al. ............ 705/71 |
| 2013/0347093 A1* | 12/2013 | von Krogh ........................ 726/9 |

* cited by examiner

MANAGING USER ACCESS WITH MOBILE DEVICE POSTURE

BACKGROUND

Computer networks, such as those available at a workplace, university, or other organization, are often configured to provide remote access to users through virtual private networks (VPNs), customized network settings, and/or other technologies. Users must typically authenticate to remote networks before being granted access. Authentication may involve users providing various authentication factors, such as user IDs, passwords, token codes, and personal identification numbers (PINs). In a typical scenario, a user submits an authentication request containing one or more authentication factors to an authentication server. The authentication server receives the request and either grants or denies network access to the user based on whether the submitted authentication factors match expected values.

A common authentication scheme involves the use of token codes. Token codes, also known as one-time passwords, or "OTPs," are generated automatically, such as by portable devices (i.e., "hard tokens"), which may be distributed to users. An example of a hard token is the SecureID® token code generator, which is available from RSA Security Inc., of Bedford, Mass. Recently, software has been developed to perform the functions of hard tokens on smart mobile devices, such as smart phones, PDAs, and tablets. Like hard tokens, these "soft tokens" generate token codes at regular intervals. Token codes generated by a soft token are displayed on a display screen of a user's smart mobile device. A token code is entered manually by the user into a login screen presented on the user's computer, which then forwards the token code, along with any additional authentication information, to the authentication server, which either grants or denies access to the user.

To enhance security, various adaptive authentication schemes have been developed. These adaptive authentication schemes collect machine-specific and user-specific information from a user's computer and provide the information to the authentication server along with other authentication factors (e.g., token codes). The authentication server then applies the information it receives about the user's computer in granting or denying access to the user. For example, prior authentication servers have employed risk engines to assess levels of risk associated with granting remote network access to certain users or their computers. The risk engines are heuristically based, collecting a wide range of information about the user's computer or about the user, based on information received from the user's computer. Gathered data are rendered as risk factors, which are weighted and combined to generate a risk score. The risk score is then tested against a predetermined threshold. If the risk score falls below the threshold, authentication of the user may proceed. If the risk score exceeds the threshold, authentication of the user may be denied.

SUMMARY

Hard tokens are generally provided as single function, output-only devices, with only one means for communicating, i.e., a display for providing token codes to users. In contrast with hard tokens, soft tokens are generally installed and run on relatively complex, multi-function devices. These devices generally support multiple communication media, such as Wi-Fi, Blue-tooth, cell phone, infrared, and cabled connections to one or more computers. The devices may run a plethora of software (e.g., "apps"), and may support various communication formats, such as file transfer, email, instant messaging, cell phone data exchange, video chat, and other forms of communication. Providing the functions of a hard token on a user device like a smart phone promotes user convenience, as the user does not have to carry multiple devices. Unfortunately, however, the use of soft tokens on mobile devices also subjects the soft tokens to security vulnerabilities and malicious attacks.

For example, fraudsters can attempt to embed viruses or scripts in files or data streams. The viruses or scripts may attack the soft token running on the user's device as part of an effort to copy, alter, or use the soft token for the fraudster's own purposes. Fraudsters can also attempt to physically alter the hardware of the user's device to circumvent security measures. As malicious users become more innovative, they continue to attempt new ways of breaking into soft tokens.

Numerous adaptive authentication techniques have been developed to allow servers to detect fraudulent activity that takes place on a user's computer. These measures have limited utility, however, when it is the user's smart mobile device, rather than the user's computer, which is the subject of attack.

In contrast with these prior techniques, which focus on a server collecting data about the user's computer, an improved technique for managing access of a user of a computing machine to a remote network collects posture information about the user's mobile device. The mobile device runs a soft token. The collected device posture information pertains to various aspects of the mobile device, such as the mobile device's hardware, software, environment, and/or users, for example. The server applies the collected device posture information along with a token code from the soft token in authenticating the user to the remote network. In some examples, the server includes a device risk engine for generating a device risk score based on the device posture information. The device risk score may be applied to selectively authenticate the user to the remote network. In some examples, the server includes a device policy engine. Based on the device posture information and a policy of the device policy engine, the policy engine refuses authentication or allows authentication to proceed if other authentication factors are satisfied. In some examples, the policy engine is also employed for selectively authorizing access to authenticated users to various resources on the remote network.

Some embodiments are directed to a method of managing access of a user of a computing machine to a remote network. The method includes receiving, from the computing machine, a token code generated by a mobile device that runs a soft token. The method further includes receiving device posture information collected by and pertaining to the mobile device. The method still further includes applying the token code and the device posture information in authenticating the user to the remote network.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

An improved technique for managing user access to a remote network collects posture information about the user's mobile device. The mobile device runs a soft token, and the collected posture information pertains to various aspects of the mobile device. The server applies the collected device posture information along with token codes from the soft token in authenticating the user to the remote network.

Figure 1:
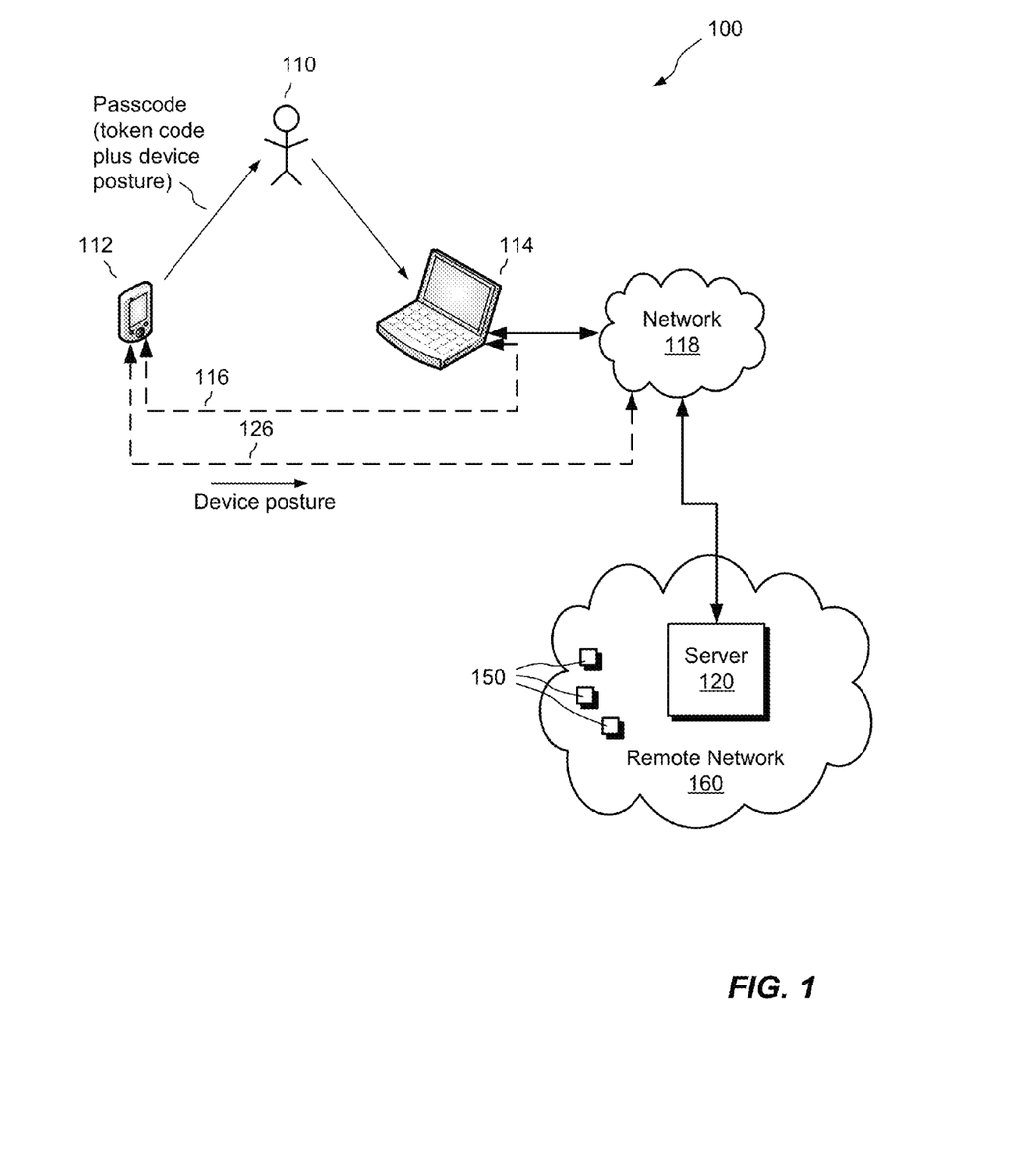
FIG. 1 is a simplified schematic diagram of an example environment in which a device used for generating token codes for authenticating a user to a server is configured to transmit device posture information to the server, which is configured to receive and apply the device posture information in authenticating users and/or authorizing user access to various resources on a remote network.

FIG. 1 shows an example environment 100 in which device posture information may be received by a server and used for managing access to a remote network in accordance with the improvements hereof. "Device posture information" relates to any information about the mobile device, its users (including user activities), and/or its environment. Device posture information may therefore include widely ranging information, such as hardware configurations, hardware settings, software loaded on the mobile device, software performance information, security information, browser history, geographical location information, user biometrics, user habits and gestures, and/or local network topology of the mobile device, to name a few.

As shown in FIG. 1, a user 110 has access to a device 112 and a computing machine 114. The computing machine 114 is connected, via a network 118, to a server 120 on a remote network 160. A communication medium 116, such as a cable or wireless connection, is provided to allow the mobile device 112 to communicate with the computing machine 114. In addition, a communication medium 126 is provided to enable communication between the device 112 and the server 120. In some examples, the communication medium 126 is a wireless medium, such a cell phone network or Wi-Fi network, for example.

The device 112 includes a soft token, which generates token codes on a regular basis, such as once per minute. Within the device 112, device posture information is collected and stored. In some examples, the collected device posture information is transmitted to the server 120 via the communication medium 126 and the network 118. In other examples, the device posture information is transmitted to the computing device 114 via the communication medium 116, and then relayed to the server 120 via the network 118. In still other examples, system posture information is partitioned into portions, and the portions are blended (e.g., via a reversible blending operation) with respective token codes from the soft token to generate passcodes, which the device 112 displays to the user 110 on a display of the mobile device 112. The user 110 may read the passcodes and manually copy them into a field displayed on a login screen on the computing machine 114. Optionally, the user 110 may enter additional information, such as a user ID, Personal Identification Number (PIN), and/or other authentication factors. The user 110 may then submit an authentication request to the server 120, using the passcode and, if provided, other authentication factors.

The server 120, upon receiving the authentication request from the computing machine 114, extracts the submitted token code and the portion of device posture information from the passcode (e.g., using a reverse blending operation). The server 120 may then apply the token code in authenticating the user, and may apply the device posture information in any of a variety of operations, which may include but are not necessarily limited to authenticating the user 110.

It is understood that the device 112 can be any hand-held or portable device, including, for example, a smart phone, PDA, tablet computer, or portable computer (e.g., a laptop). The computing machine 114 can also be any type of computing machine, such as a laptop computer, desktop computer, server, virtual machine, tablet, smart phone or PDA. The network 118 is generally a public network. The network 118 may include a Local Area Network (LAN), a Wide Area Network (WAN), a cellular phone network, a virtual network, the Internet, some other network, or any combination of the foregoing, for example. The server 120 is typically a Virtual Private Network (VPN) server. The server 120 typically includes an authentication server or has access to an authentication server. It is understood that the server 120 may include one or more computers operating in coordination to provide users with access to resources 150 on the remote network 160.

The remote network 160 is typically an organizational network, such as a corporate network or government network. In contrast with the network 118, which is generally public, the remote network 160 is typically a private network. Access to the remote network 160 may typically be granted to off-site users via the server 120.

Figure 2:
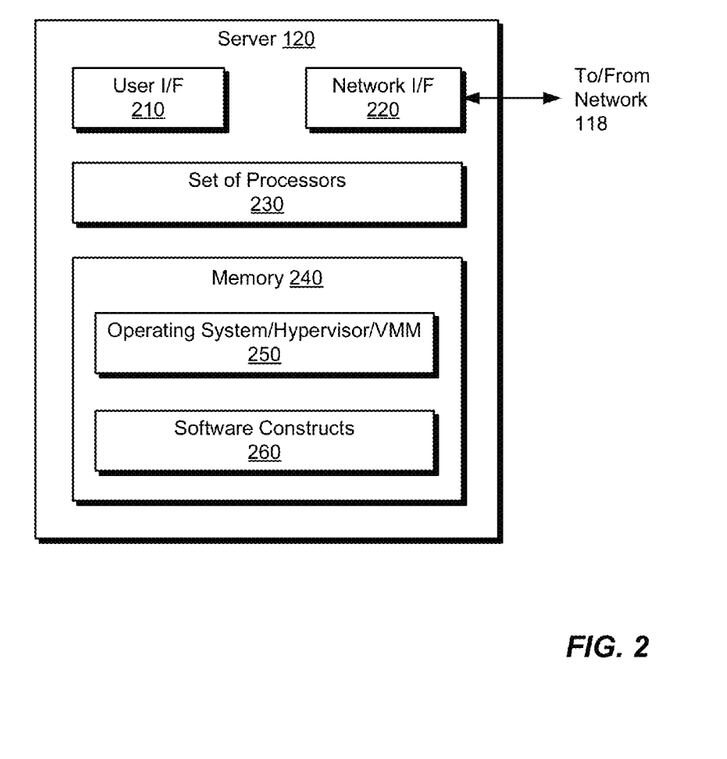
FIG. 2 is a block diagram of an example server of FIG. 1.

FIG. 2 shows an example server 120 in greater detail. Here, it is seen that the server 120 includes a user interface 210 and a network interface 220. In an example, the user interface 210 includes a keyboard, pointer, and display, and the network interface 220 includes one or more network interface cards (NICs) for connecting to the network 118. The server 120 also includes a set of processors 230 (e.g., one or more processing chips and/or assemblies) and memory 240. It is understood that the set of processors 230 and the memory 240 together form a specialized circuit that is constructed and arranged for performing various functions and processes as described herein.

The memory 240 includes both volatile memory (e.g., RAM) and non-volatile memory (e.g., a disk drive) and stores instructions for running an operating system 250 and various software constructs 260. The server 120 may be provided in the form of a physical machine or a virtual machine. If provided as a virtual machine, the operating system 250 may be used in connection with a hypervisor and/or a virtual memory manager.

Figure 3:
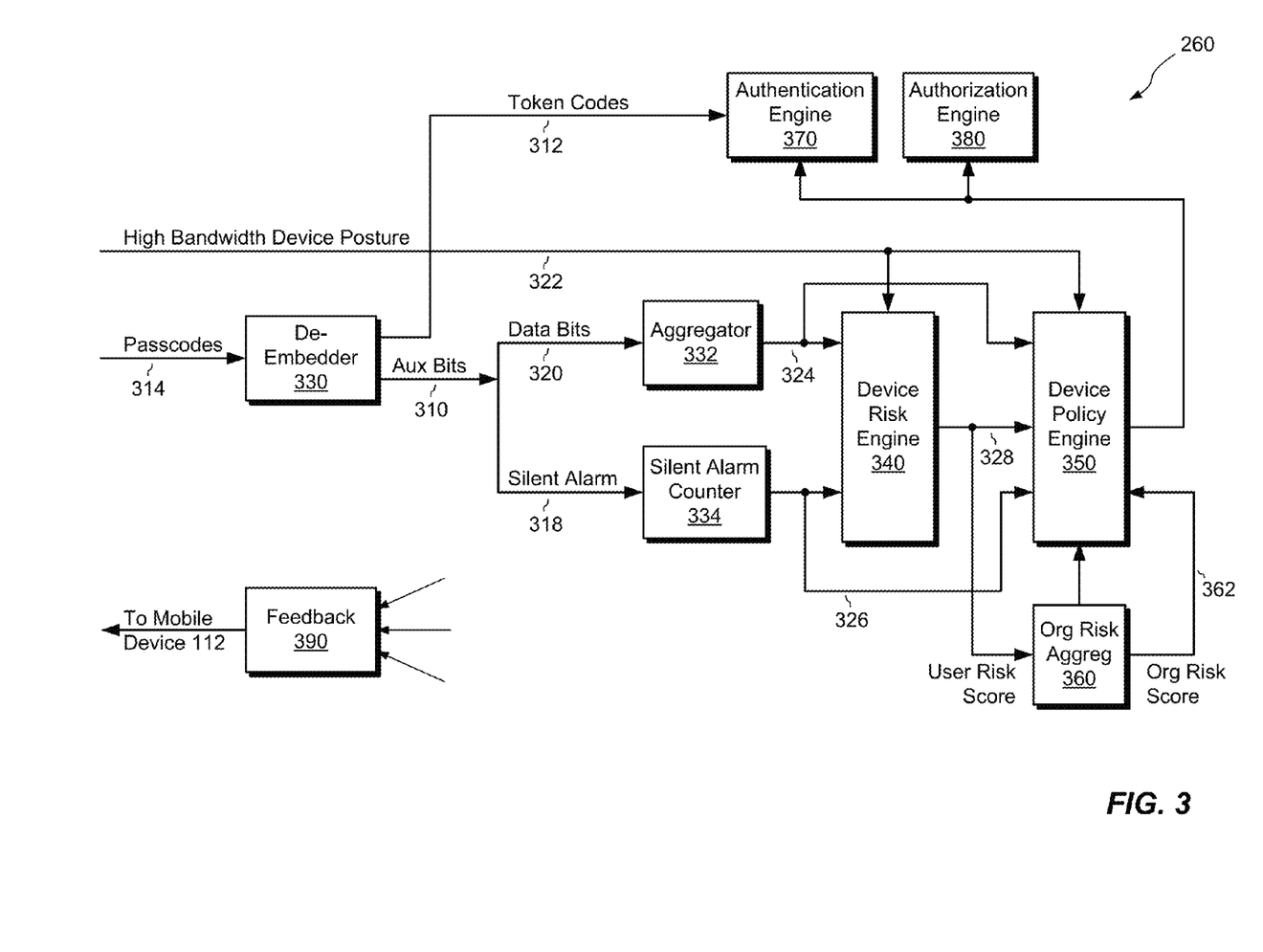
FIG. 3 is a more detailed block diagram of example portions of the server of FIG. 2.

FIG. 3 shows an example arrangement of software constructs 260 that run on the server 120. Here, a de-embedder 330 receives passcodes 314 generated by the mobile device 112 and extracts from the passcodes 314 sequences of auxiliary bits 310 and token codes 312. The token codes 312 are sent to an authentication engine 370, for use in authenticating the user 110, and the auxiliary bits 310 are separated into data bits 320 and a silent alarm 318. The silent alarm 318 conveys an alarm from the mobile device 112 in response to the occurrence of a trigger event at the mobile device 112. Trigger events may include, for example, detection of tampering on the mobile device 112, detection of malware running on the mobile device 112, and/or detection of other suspect activities.

Typically, one sequence of auxiliary bits 310 is obtained from each passcode 314. In one example, each sequence of auxiliary bits 310 is four bits long, three bits being the data bits 320 and one bit being the silent alarm 318. The data bits 320 convey portions of device posture information about the device 112. An aggregator 332 accumulates the portions of device posture information received over multiple login attempts into a record 324 of device posture information. A silent alarm counter 334 counts the number of times the silent alarm 318 has been triggered and produces a silent alarm count 326.

In addition to (or as an alternative to) receiving device posture information via auxiliary bits 310 embedded in passcodes 314, the server 120 in some examples receives device posture information 322 over a high bandwidth path (e.g., over the communication medium 126 or the communication medium 116 operating in cooperation with the computing machine 114). When using a high bandwidth path, an arbitrarily large amount of device posture information may be conveyed. It may not always be possible to use a high bandwidth path, however, as it is expected that the mobile device 112 may often be offline or otherwise unable to access the network 118. Even when the high bandwidth path is available, it is still desirable to continue receiving posture information via passcodes 314, as auxiliary bits 310 can continue to provide the silent alarm 318.

The device posture information 322/324 and the silent alarm count 326 are each provided to a device risk engine 340. The device risk engine 340 processes the device posture information 322/324 and the silent alarm count 326 to generate a device risk score 328. The device risk score 328 indicates a level of risk, based on the device posture information received, of authenticating the user 110 to the remote network 160. For example, a high risk score 328 may indicate a high probability of malicious activity, whereas a low risk score 328 may indicate a low probability of malicious activity. In some examples, a predetermined threshold is established for identifying an unacceptable level of risk. If the device risk score 328 exceeds this threshold, authentication of the user 110 to the remote network 160 may be denied. In some examples, the device risk engine 340 is configured to increase the device risk score 328 markedly as the silent alarm count 326 increases, such that a high silent alarm count 326 (e.g., one that exceeds a predetermined threshold associated with high risk) results in a high device risk score 328, even in the absence of other detected risk factors.

In some examples, the device risk score 328 is provided to an organizational risk aggregator 360. The organizational risk aggregator 360 aggregates risk scores 328 across different users accessing the server 120 to generate an overall risk score 362 to the organization as a whole. Individual risk scores 328 may be combined in any suitable way. In some examples, the organizational risk aggregator 360 computes the organizational risk score 362 by calculating an average risk score across multiple users. In other examples, the organizational risk aggregator 360 applies more sophisticated techniques, such as weighting certain risk scores 328 disproportionately relative to other risk scores 328 where high risk scores from individual users may place the organization as a whole at increased risk.

The device posture information 322/324 and the silent alarm count 326 are each also provided to a device policy engine 350. The device policy engine 350 stores a rule-based policy for managing user authentication, authorization, and/or other operations. The device policy engine 350 enacts its policy at least in part through directives issued to the authentication engine 370 and authorization engine 380, to allow or deny user authentication or user access to authenticated users to various resources on the remote network 160 in response to the device posture information 322/324, as well as any other inputs it receives.

The software constructs 260 of the server 120 may also include a feedback processor 390. The feedback processor 390 gathers information and/or instructions from the server 120 and transmits the information and/or instructions to the mobile device 112. In some examples, the instructions include a request to be sent particular device posture information. The mobile device 112 may then respond by including the requested device posture information embedded in subsequent passcodes 314 that it issues, or by sending the information to the server 120 directly. The collected device posture information can change over time to include new or modified types of device posture information. In some examples, the instructions include directions for transmitting device posture information efficiently, or according to certain protocols coordinated between the mobile device 112 and the server 120. The feedback processor 290 thus enables there to be an adaptive process for gathering and transmitting device posture information from the mobile device 112 to the server 120.

In some examples, the mobile device 112 may be provided with a local risk engine (not shown) and a local silent alarm counter (not shown). Feedback received by the mobile device 112 from the feedback processor 390 may include an instruction to the local risk engine to gather device posture information locally and compute a local risk score. The local risk in some examples is computed at least in part based upon a count of the local silent alarm counter. Using a coordinated protocol, the mobile device 112 transmits the computed local risk score to the server 120. The server 120 then applies the local risk score as an input to the device risk engine 240 in computing the device risk score 328. In some examples, the server 120 may use the local risk engine in place of the device risk engine 340, to reduce processing demands on the server 120 and to reduce the volume of device posture information that must be received.

Example operation of the device policy engine 350 will now be discussed with continued reference to FIG. 3. In some examples, the rule-based policy employed by the device policy engine 350 is implemented as arrays of conditional statements. These conditional statements take the general form, IF<particular condition detected>THEN <perform action>. It is understood that these conditional statements may be arbitrarily complex and may contain nested conditional statements with many switches and parameters. In other examples, the device policy engine 350 employs fuzzy logic, such as Beyesian techniques or neural nets, in converting detected conditions to actions.

The device policy engine 350 detects conditions by monitoring its inputs and performs actions by issuing directives (e.g., instructions) at its outputs. An arbitrarily large and complex array of conditions and directives are possible.

In some examples, the device policy engine 350 monitors the device risk score 328 and denies authentication of the user if the device risk score 328 exceeds a predetermined threshold, notwithstanding whether the user's token code 312 and any other authentication factors have been confirmed, and notwithstanding whether the device risk engine 340 separately denies authentication. Thus, the device policy engine 350 can override the authentication engine 370 to deny access to otherwise legitimately authenticated users.

In some examples, the device policy engine 350 monitors the device risk score 324 and/or the organizational risk score 362 and applies a sliding scale of authorization to users based on one or both of these risk scores. For example, the device policy engine 350 directs the authorization engine 380 to allow a user to access only the user's email account on the remote network 160 if either or both of the risk scores 328 and 362 are higher than normal. Authorization of the user may be limited in this manner even if the user normally has full access rights to other resources on the remote network 160, such as applications or file servers. Where risk factors are low, the device policy engine 150 may refrain from limiting the user's access to any resources 150, such that the user's access to resources 150 on the remote network 160 is limited only by the user's accounts and privileges, for example.

In some examples, the device policy engine 350 monitors both the device risk score 328 and the organizational risk score 362. If the organizational risk score 362 is high, the device policy engine 350 applies a lower than normal threshold to the device risk score 328 and bars authentication if the device risk score 328 exceeds the lower threshold. In some examples, the threshold for barring authentication is varied in inverse proportion to the organizational risk score 362.

In certain examples, the device policy engine 250 is configured to respond strongly to the silent alarm count 326. The device policy engine 250 may thus direct the authentication engine 370 to deny authentication, or direct the authorization engine 380 to strictly limit access to resources 150, if a high silent alarm count 326 is detected.

In some examples, the device policy engine 350 monitors device posture information 322/324 and takes action based on the posture information in authenticating or authorizing users. Actions taken are independent of the device risk score 324 and/or organizational risk score 362, and instead are based on an independent assessment of the device posture information by the device policy engine 350.

In some examples, the device posture information 322/324 includes geographic information about the location of the mobile device 112 (i.e., "geolocation" information). The geolocation information may be conveyed in different ways, such as in latitude and longitude, GPS coordinates, a location of a cell phone tower serving the mobile device 112, or other ways. In this example, the device policy engine 350 includes one or more rules about particular geographic locations. For example, users in a particular country may be barred from authenticating to the remote network 160 or may receive limited authorization for accessing resources 150 when logged in from that country. The device policy engine 150 reads the geolocation information from the device posture information 322/324 and takes action according to its rules. For example, the device policy engine 350 denies authentication based on the geolocation of the mobile device 112 if the device posture information indicates that the mobile device 112 is being used in a country for which access is denied.

Certain countries have strict rules limiting how user data must be treated and/or whether it is allowed for a user's computing activity to be tracked. In some examples, the device policy engine 350 reads the user's geolocation from the posture information 322/324 received from the mobile device 112 and directs behavior of the server 120 consistent with the laws of the country from which the mobile device 112 operates. If the behavior of the server cannot be readily modified, the device policy engine 350 denies access to the user or directs the user to login via a different server that is configured to operate in compliance with the laws of the country from which the login request originates.

In some instances, operation of the device risk engine 340 and/or device policy engine 350 suggests a high probability of malicious conduct. In these situations, rather than denying access to the remote network 160, the device policy engine 350 instead forces the user to login through a specially configured VPN server (e.g., a "hacker VPN"). The hacker VPN then closely monitors the activities of the suspect user, both to protect the resources 150 on the remote network 160 and to observe and record the user's behavior to learn about the methods and means employed by the suspect user.

The device policy engine 350 can operate based on very specific information. For example, it may be necessary at times to ensure that certain individual users in an organization are not allowed to communicate directly with one another, or are not allowed to communicate about certain subjects with one another. In these instances, the device policy engine 350 may operate to ensure that specific users are not allowed to access one another's files or applications, even if those users would normally be able to do so.

Like the device policy engine 350, the device risk engine 340 may also be configured in a variety of ways. Additional details of the device risk engine 340 will now be discussed in connection with FIGS. 4 and 5.

Figure 4:
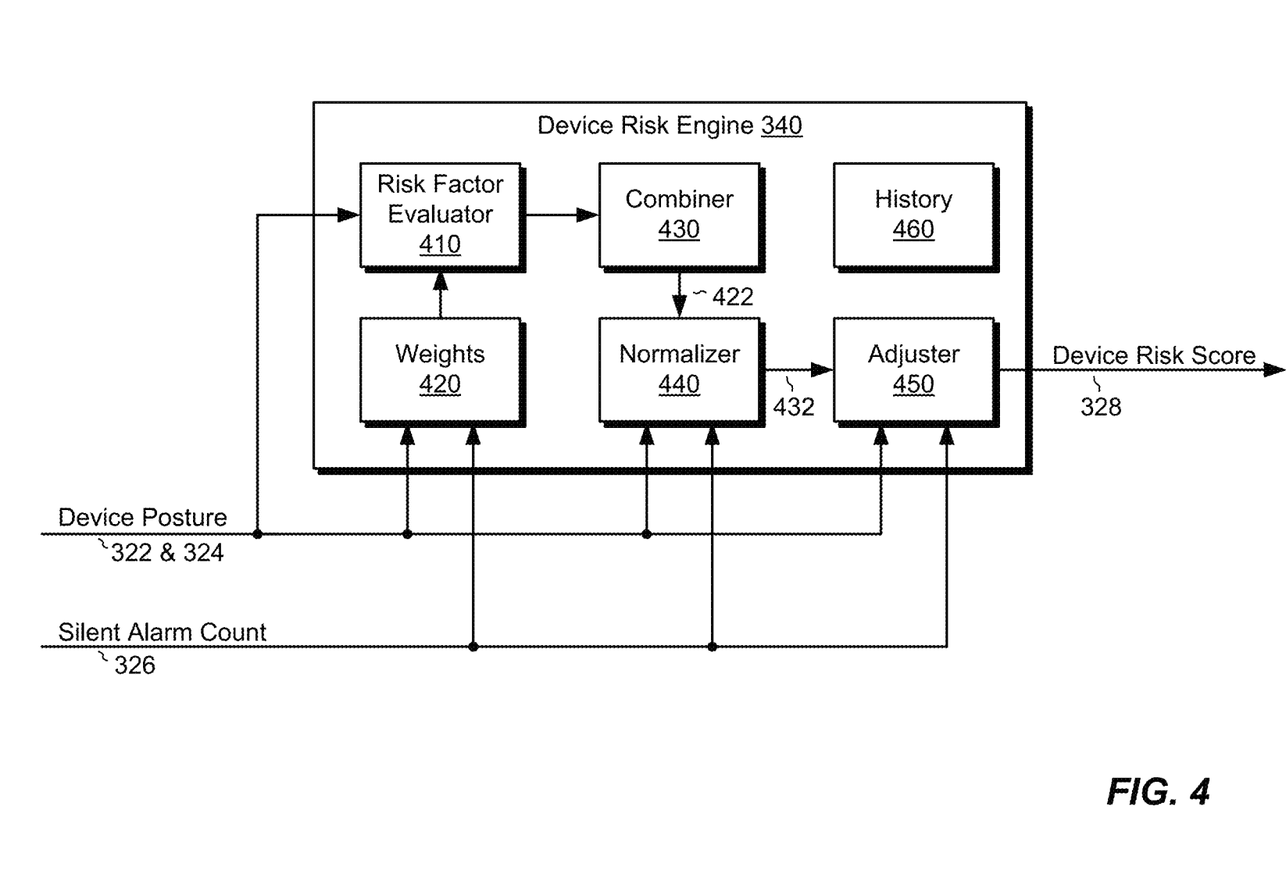
FIG. 4 is a block diagram of the example device risk engine of FIG. 3.

FIG. 4 shows an example arrangement of components of the device risk engine 340. Here, it is seen that the device risk engine 340 includes a risk factor evaluator 410, a set of adjustable weights 420, a combiner 430, a normalizer 440, an adjuster 450, and a history 460. In operation, the risk factor evaluator 410 evaluates (e.g., grades) a set of risk factors based on the device posture information 322/324. Evaluated risk factors are weighted by the weights 420, and the weighted risk factors are combined using the combiner 430 to produce a raw risk score 422. The raw risk score 422 is then normalized by the normalizer 440, to produce a normalized risk score 432, and the normalized risk score 432 is adjusted by the adjuster 450 to produce the device risk score 328. The history 460 stores previous values of device posture information 322/324 in connection with the user 110, which the risk factor evaluator 410 may access to identify changes in device posture over time. For example, the history 460 may store a MAC address of the user's mobile device 112. Later, when the MAC address is again obtained via new device posture information 322/324, the risk factor evaluator 410 can check the history 460 to determine whether the MAC address of the user's device 112 has changed. A change in MAC address may raise the value of a risk factor (e.g., one for verifying that the user's device is the same as before). The risk factor is then weighted by the weights 420, and processed along with other weighted risk factors in producing the device risk score 328.

The combiner 430 may operate according to any number of methodologies, including, for example, weighted sums, arrays of conditional statements, Beyesian logic, neural networks, and/or other fuzzy logic. The normalizer 440 post-processes the raw risk score 422 to generate a normalized risk score 432 that fits within a predetermined fixed range. The adjuster 450 takes the normalized risk score 432 and makes an after-the-fact adjustment based on the device posture 322/324 and/or the silent alarm count 326. For example, the adjuster 450 may respond to a large silent alarm count 326 by setting the device risk score 328 to a maximum possible value, to ensure that the device risk score 328 reflects the severity of risk associated with the high silent alarm count 326, notwithstanding the normal operation of the device risk engine 340. Device posture information 322/324 may convey additional details concerning security risks. The adjuster 450 can thus override normal function of the device risk engine 340 when malicious activity is clearly suspected.

In some examples, device posture information 322/324 is provided to each of the components 410, 420, 440, and 450 for effecting change to each respective component. For example, the device posture information 322/324 can convey new risk factors to be added to the set of risk factors in the risk factor evaluator 410, or can modify risk factors and/or remove risk factors from consideration. The device posture information 322/324 can change the weights 420 attributed to different risk factors. The device posture information 322/324 can further change the operation of the normalizer 440 to operate according to different algorithms, and/or can vary the settings of the adjuster 450. Also, the silent alarm count 326 can be applied to weights 420, normalizer 440, and/or adjuster 450 to convey a heightened risk state to each of these components, thereby further assuring that high values of the silent alarm count 326 are reflected in the device risk scores 328.

Figure 5:
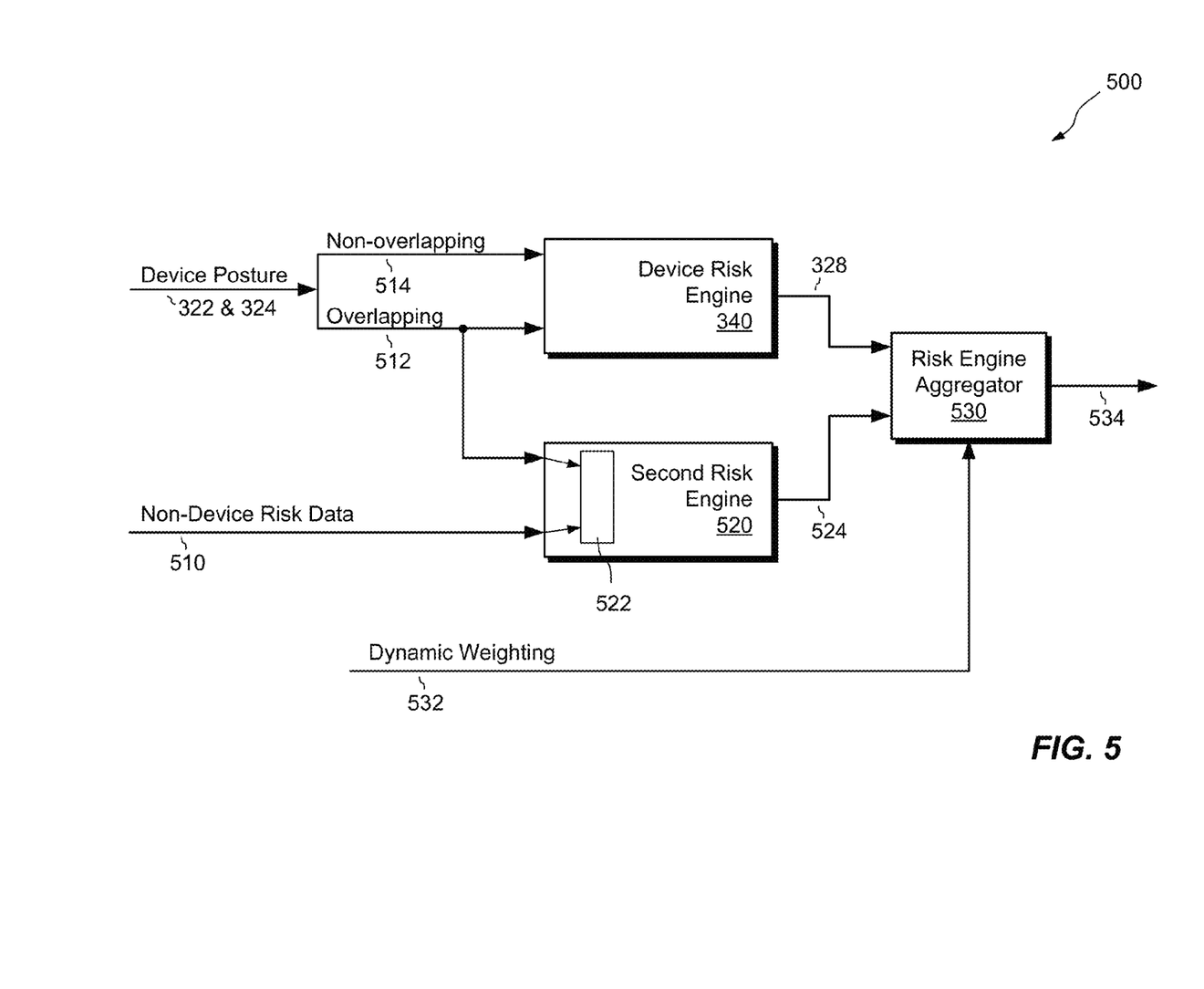
FIG. 5 is a block diagram of the example device risk engine of FIG. 3 used in combination with a second risk engine.

FIG. 5 shows an example arrangement 500 in which the device risk engine 340 is used in connection with a second risk engine 520. In some examples, the second risk engine 520 is a risk engine on the server 120 that assesses risk factors associated with the user 110, the user's computing machine 114, the network 118, the resources 150, the remote network 160, and/or the server 120 itself, or any combination of the foregoing. Information pertaining to these risk factors is conveyed to the second risk engine 520 in non-device risk data 510.

In some arrangements, device posture information 322/324 from the mobile device 112 is divided into overlapping information 512 and non-overlapping information 514. Overlapping information 512 includes device posture information 322/324 that relates to risk factors used by both the device risk engine 340 and the second risk engine 520. These may include, for example, risk factors associated with the user 110 and/or the network 118. Non-overlapping information 514 includes device posture information 322/324 that relates to risk factors used by the device risk engine 340 but not by the second risk engine 520. These may include, for example, risk factors associated with the mobile device 112.

The device risk engine 340 receives the device posture information 322/324, and the second risk engine 520 receives the non-device risk data 510 and the overlapping device posture information 512. The device risk engine 340 and the second risk engine 520 compute respective risk scores 328 and 524, and the risk scores 328 and 524 are combined using a risk engine aggregator 530. The risk engine aggregator 530 produces a combined risk score 534, which reflects a weighted combination of the risk scores 328 and 524. In some examples, weighting of the risk scores 328 and 524 is established using dynamic weighting 532, which is derived from the device posture information 322/324, the silent alarm count 326, and/or other factors.

In some examples, weighted or raw risk factors, rather than risk scores 328 and 524, are output to the risk engine aggregator 530, which applies its own weighting to the risk factors to produce the combined risk score 534. For overlapping device posture information 512, the dynamic weighting 532 of the risk engine aggregator 530 may take into account a confidence level in the mobile device 112 versus a confidence level in the source of the non-device risk data 510. The dynamic weighting 532 may then apply higher value weights to risk factors derived from the source with the higher confidence level.

In some examples, overlapping data 512 is compared with corresponding data from the non-device risk data 510 to identify areas of agreement and/or disagreement. For example, device posture information 322/324 related to the geolocation information of the mobile device 112 can be compared with non-device risk data 510 pertaining to geolocation of the same user's computing machine 114 to determine whether there is a match. A comparison engine 522 is provided to identify agreements and disagreements between the overlapping data 512 and the non-device risk data 510. The comparison engine 522 may increase weights of risk factors for which there is agreement to reflect higher confidence in such factors. The comparison engine 522 may also downgrade weights of risk factors for which there is disagreement and/or direct further inquiry to resolve the disagreement.

It is understood that the arrangement 500 may be substituted for the device risk engine 340 in FIG. 3, with the combined risk score 534 provided in place of the device risk score 328 to provide input to the device policy engine 350 and the organizational risk aggregator 360. Alternatively, the second risk engine 520 and the risk engine aggregator 530 may be added to the arrangement of FIG. 3, with the combined risk score 534 used independently (i.e., provided to components other than the device policy engine 350 and/or organizational risk aggregator 260).

Figure 6:
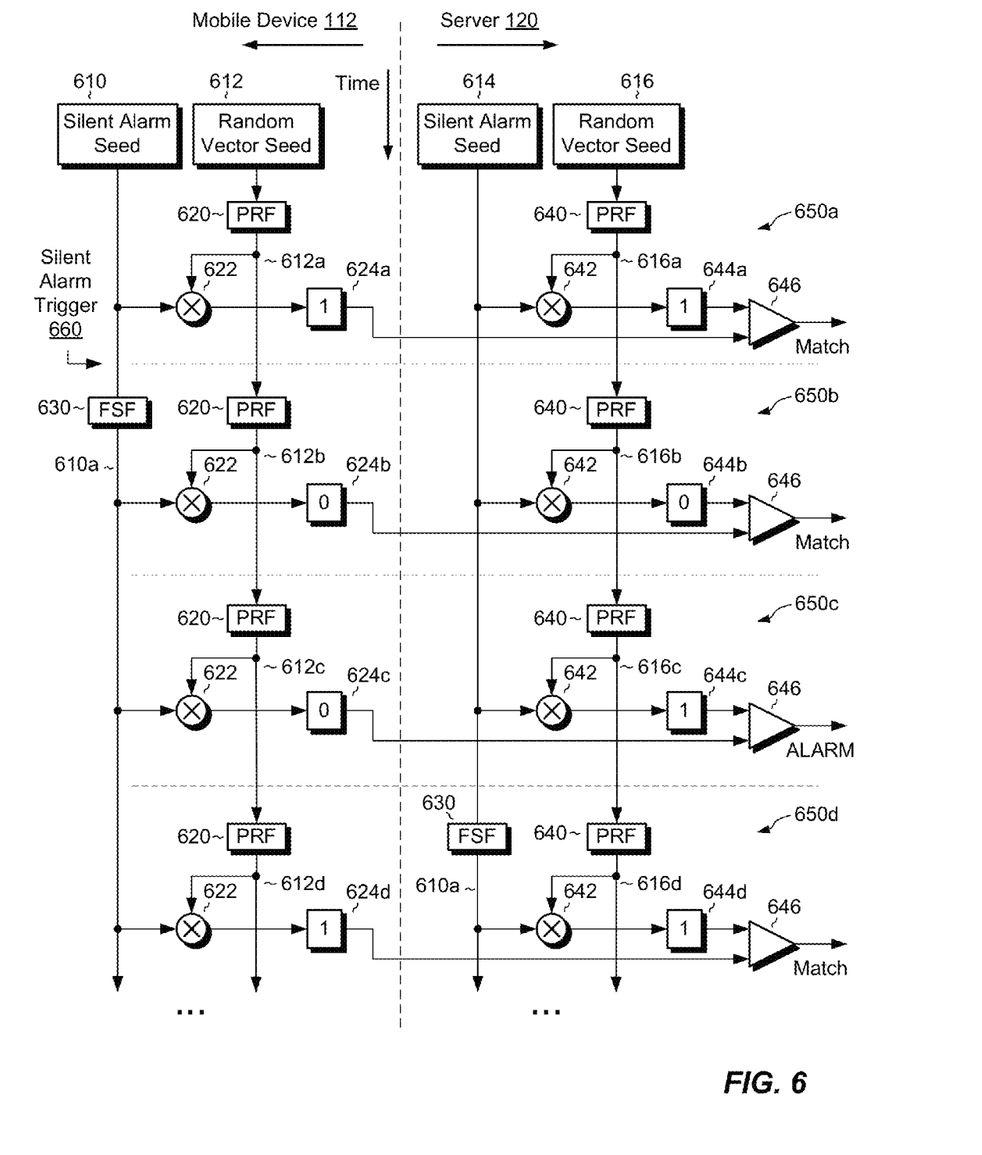
FIG. 6 is a diagram showing example generation of a silent alarm on both the mobile device and on the server of FIG. 1, as well as monitoring of silent alarms on the server to compute silent alarm counts.

FIG. 6 shows a simplified example of silent alarm operation. As indicated in connection with FIG. 3, the auxiliary bits 310 may include one or more silent alarm bits 318 (e.g., one bit) to indicate whether the mobile device 112 has been tampered with or otherwise subjected to malicious activity. A silent alarm counter 334 counts the number of times the silent alarm 318 is triggered.

The silent alarm bit appears to vary randomly. Yet, it follows a specific pattern that allows the mobile device 112 to silently communicate suspect activity to the server 120. If the silent alarm is triggered, the server 120 detects the triggered state and responds. The response of the server 120 may include disabling the soft token on the mobile device 112, refusing to accept future login attempts from the mobile device 112, or other measures. Because the silent alarm bit is one of the auxiliary bits 310 embedded in passcodes 314 received from the mobile device 112, the silent alarm 318 is bound to the other associated auxiliary bits 310 and can therefore be used directly as an indicator of trust in those other auxiliary bits. Therefore, the server 120 may use the silent alarm 318 in determining whether to trust the data that it receives on other auxiliary bits 310 provided along with the silent alarm 318. Also, the server 120 may permanently distrust auxiliary bits 310 from a mobile device 112 whose silent alarm 318 has been triggered. In some examples, the server 120 may continue to allow logins from users whose passcodes 314 indicate triggered silent alarms 318, while closely monitoring them, to collect data on the behavior of such users.

As described in connection with FIG. 3, the silent alarm counter 334 counts silent alarm triggers. Multiple silent alarm triggers may thus be received by the server 120 and counted, to provide an indication that malicious behavior detected by the mobile device 112 is repeating or continuing.

As shown in FIG. 6, activities are conducted in parallel on the mobile device 112 and on the server 120. The mobile device 112 and the server 120 are both provisioned with a silent alarm seed 610/614 and a random vector seed 612/616. The silent alarm seeds 610 and 614 are identical, i.e., they are synchronized between the mobile device 112 and the server 120. The random vector seeds 612 and 616 are also synchronized. In one example, the silent alarm seed 610/614 and random vector seed 612/616 are each 64-bit values. Although the random vector seed 612/616 may be publicly known, the silent alarm seed 610/614 is generally retained as a secret.

Operation will now be described with reference to different time frames 650a-650d. Each timeframe 650a-650d represents an interval of time during which respective passcodes 314 are generated by the mobile device 112. For simplicity, it is shown that each passcode 314 created is sent to the server 120. Those skilled in the art will recognize, however, that the server 120 will typically not receive each passcode 314 generated, but rather can remain synchronized with the mobile device 112 by "fast-forwarding" through different timeframes, employing jump tables, or using other known techniques.

For each passcode 314 produced by the mobile device 112, the silent alarm value (initially, the silent alarm seed 610) is sampled. As shown in timeframe 650a, sampling is initiated by subjecting the random vector seed 612 to a pseudo-random function (PRF) 620 to generate a pseudo-random signal 612a. An inner product multiplier 622 then calculates the modulo-2 of the inner product of the pseudo-random signal 612a and the silent alarm value 610. The result of the inner product is a single silent alarm bit 624a. The sequencer 252 may include this bit 624a as one of the auxiliary bits 310, which is combined with a token code 312 to form a passcode 314.

If the passcode 314 is used as part of a login attempt (as assumed in this example), the passcode 314 is transmitted to the server 120, where the auxiliary bits 310 are extracted, including the silent alarm bit 624a.

A parallel process takes place at the server 120. A random vector seed 616 is subjected to a pseudo-random function (PRF) 640 to generate a pseudo-random signal 616a. The pseudo-random function 640 is identical to the pseudo-random function 620. An inner product multiplier 642 calculates the modulo-2 of the inner product of the pseudo-random signal 616a and the silent alarm value 614. The result of the inner product is a predicted silent alarm bit 644a. The server 120 then compares (e.g., using comparator 646) the predicted silent alarm bit 644a with the actual silent alarm bit 624a that it received via the passcode 314. Since the same operations are performed on the same starting values, the two bits 624a and 644a are identical, and there is a match.

The activities of timeframe 650a can continue as described above. Owing to the pseudo-random function 620, different parts of the silent alarm seed 610 will be sampled and transmitted to the server 120. Without a silent alarm trigger, different silent alarm bits will continue to match between the mobile device 112 and the server 120.

At some point, however, a silent alarm trigger 660 may occur. This trigger may occur in response to a detection of tampering or malware on the mobile device 112, for example. As shown in timeframe 650b, the mobile device 112 increments the state of the silent arm upon detection of the trigger by subjecting the current silent alarm value to a forward secure function (FSF) 630. The forward secure function 630 is a one-way function, such as FS_PRNG, which cannot be reversed. The forward secure function 630 generates a new silent alarm value 610a, which is then used as input to the inner product multiplier 622.

On successive login attempts, silent alarm bits 624b, 624c, and 624d are created, which represent samples of the new silent alarm value 610a. These bits may match expected values on the server 120 by accident, as they do in timeframe 650b (since there is a 50% probability of a match even when samples are taken of different silent alarm values). The probability of continued matches decreases exponentially on successive login attempts, however, and, eventually, as shown in timeframe 650c, a mismatch is detected.

The mismatch alerts the server 120 that the silent alarm on the mobile device 112 has been triggered and, therefore, that the server 120 should not trust any of the auxiliary bits received with the mismatching silent alarm. The server may also register that auxiliary bits obtained during immediately prior login attempts (e.g., during the timeframe 650b) are also not to be trusted, since there is a reasonable probability that the silent alarm was triggered before the auxiliary bits for those logins were received, as well.

Once the server 120 detects the mismatch, it increments its local silent alarm value (e.g., during timeframe 650d) by subjecting its local silent alarm value to the same forward secure function 630 as was used during timeframe 650b on the mobile device 112. The silent alarm values between the mobile device 112 and the server 120 will then once again be in sync, and sampled silent alarm bits will continue to match until another silent alarm trigger, like the silent alarm trigger 660, occurs. Further activity may be required, however, before the server 120 trusts any auxiliary bits 310 received from the mobile device 112, as it may remain to be determined whether or not the event that caused the silent alarm trigger 660 indicates a permanent security breach.

Given the arrangement of FIG. 6, it is evident that the silent alarm counter 334 may operate by counting the number of alarms generated by the comparator 646. For example, the silent alarm count 326 transitions from 0 to 1 between the timeframes 650b and 650c. As additional triggers 660 occur on the mobile device 112, the silent alarm value on the mobile device 112 is subjected to additional iterations of the forward-secure function 630, with each iteration triggering an alarm on the server 120 when the predicted silent alarm bit 644 disagrees with the respective received silent alarm bit 624. Each silent alarm trigger 660 on the mobile device 112 thus causes the silent alarm count 326 on the server 120 to be incremented by one.

The forward-secure nature of the silent alarm 318 makes it a very difficult signal form malicious users to compromise. Without the silent alarm seed 610/614, predicting the silent alarm bit is nearly impossible. Given the high degree of security in the silent alarm 318, the silent alarm count 326 is a highly trusted measure of security of the mobile device 112. The device risk engine 340 and device policy engine 350 thus derive a benefit from applying the silent alarm count 326 in risk scoring and policy actions.

Figure 7:
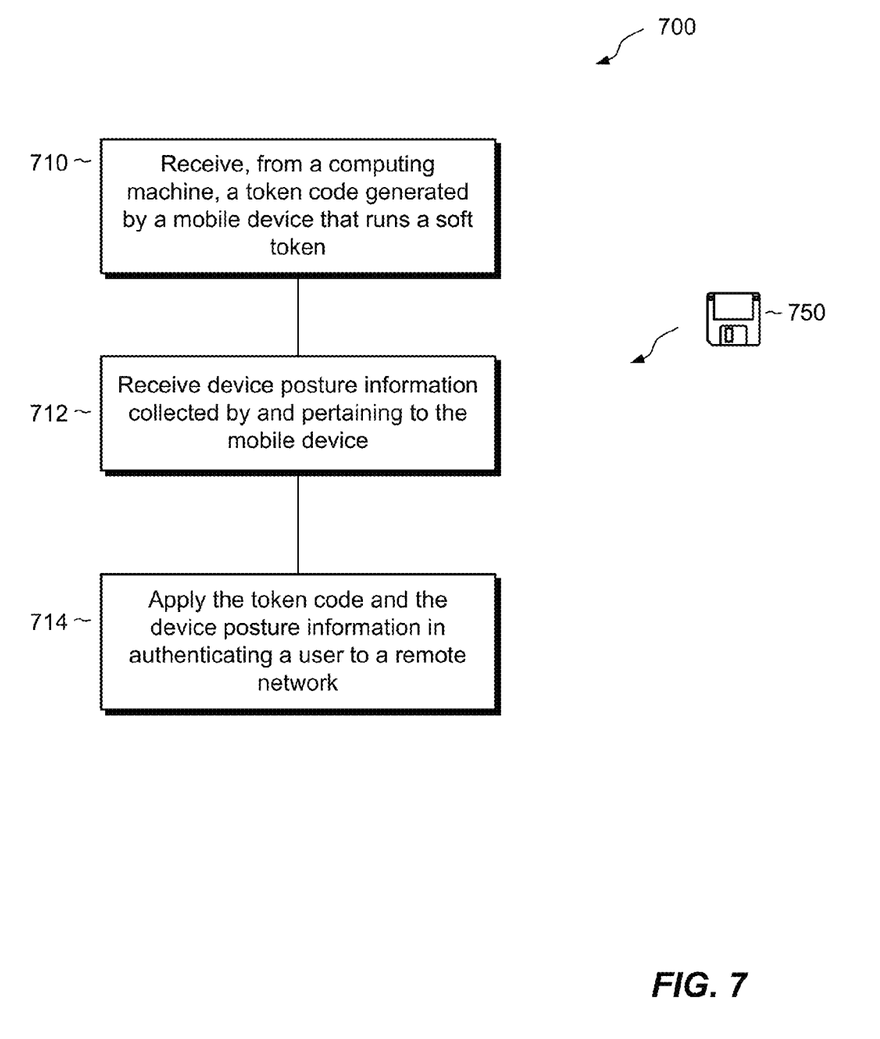
FIG. 7 is a flowchart showing an example process for managing access to a remote network.

FIG. 7 shows an example process 700 for managing access of a user 110 of a computing machine 114 to a remote network 160. The process 700 may be carried out, for example, by the server 120, or some other server, in connection with the computing environment 100. The process 700 is typically performed by the software constructs 260, described in connection with FIGS. 2-5, which reside in the memory 240 of the server 120 and are run by the set of processors 230. The various acts of the process 700 may be ordered in any suitable way. Accordingly, embodiments may be constructed in which acts are performed in orders different from those illustrated, which may include performing some acts simultaneously, even though the acts are shown as sequential in the illustrated embodiments.

At step 710, the server 120 receives, from the computing machine 114, a token code 312 generated by the mobile device 112. For example, the mobile device 112 includes a soft token, which generates new token codes 312 on a regular basis. The token codes may be displayed as they are, or combined (e.g., blended using a reversible blending operation) with sequences of auxiliary bits 310 to produce passcodes 314, which the mobile device 112 displays to the user 110. The user 110 may then manually copy a passcode 314 (or simply a token code 312, if no blending is performed) from the display of the mobile device 112 to a login screen on the computing machine 114, enter any other required authentication information, and submit an authentication request. The server 120 receives the authentication request, including the passcode 314, or simply the token code 312. If a passcode 314 is received, the server 120 extracts the token code 312 and the auxiliary bits 310 (e.g., by applying a reverse blending operation).

At step 712, the server 120 receives device posture information 322 and/or 324 collected by and pertaining to the mobile device 112. For example, the server 120 receives posture information 322 via a high bandwidth pathway between the mobile device 112 and the server 120, and/or the server 120 receives passcodes 314 that include sequences of auxiliary bits 310 containing device posture information, where the auxiliary bits 310 are generated by the device 112 and manually input by the user 110 to the computing machine 114 for transmission to the server 120 as part of an authentication request.

At step 714, the server 120 applies the token code 312 and the device posture information in authenticating the user 110 to the remote network 160. For example, the server 120 provides the received device posture information to a risk engine 340 and authenticates the user 110 if the token code 312 matches an expected value and the device posture information does not result in a high risk score from the device risk engine 340. In some examples, step 714 also includes the server 120 providing the received device posture information to a policy engine 340, and authenticating the user 110 if the token code 312 matches an expected value and the device posture information does not indicate an inconsistency with a policy of the device policy engine 350.

An improved technique has been described that collects posture information about a user's mobile device 112. The mobile device 112 runs a soft token, and the collected posture information pertains to various aspects of the mobile device 112. The server 120 applies the collected device posture information along with token codes 312 from the soft token in authenticating the user 110 to the remote network 160.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, it has been shown and described that the server 120 includes both a risk engine 340 and a policy engine 350. However, this is merely an example. Alternatively, only the risk engine 340 is used, or only the policy engine 350 is used. In other alternatives, neither a risk engine 340 nor a policy engine 350 is used. Rather, other means are used for applying device posture information in authenticating a user to a remote network.

Also, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 750 in FIG. 7). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of managing access of a user of a computing machine to a remote network, comprising:
   receiving, from the computing machine, a token code generated by a mobile device that runs a soft token;
   receiving device posture information collected by and pertaining to the mobile device; and
   applying the token code and the device posture information in authenticating the user to the remote network,
   wherein applying the token code and the device posture information in authenticating the user to the remote network includes providing the device posture information to a device risk engine and generating a device risk score by the device risk engine the device risk score indicating a level of risk, based on the device posture information received, of authenticating the user to the remote network,
   wherein the token code is received in the form of a passcode that includes the token code combined with a sequence of auxiliary bits that convey device posture information,
   wherein the method further comprises aggregating sequences of auxiliary bits obtained through multiple login attempts to assemble a record of device posture information, and
   wherein receiving the token code takes place in response to (i) the mobile device displaying the token code and (ii) a user of the mobile device manually transferring the token code from the mobile device to the computing machine.

2. The method of claim 1, wherein applying the token code and the device posture information in authenticating the user to the remote network includes providing the device posture information to a rule based device policy engine and denying authentication of the user to the remote network in response to the device posture information indicating a condition that is prohibited by the rule based policy engine.

3. The method of claim 1, wherein applying the token code and the device posture information in authenticating the user to the remote network includes providing the device posture information to a rule based device policy engine and, in accordance with the rule based policy engine identifying suspect activity, forcing the user to logon to the remote network using a server configured to monitor activities of the user.

4. The method of claim 1, further comprising comparing the device risk score to a predetermined threshold and denying authentication of the user to the remote network in response to the device risk score exceeding the predetermined threshold.

5. The method of claim 1, further comprising aggregating device risk scores from different users to generate an organizational risk score indicating a level of risk of an organization as a whole based on the device risk scores of individual users.

6. The method of claim 1, wherein the device risk engine takes into account multiple risk factors in generating the device risk score, wherein different risk factors have different weights, and wherein the weights of the different risk factors are adjustable in response to changes in the record of device posture information.

7. The method of claim 6, further comprising the device risk engine adjusting the device risk score after receiving particular device posture information.

8. The method of claim 6, further comprising receiving a new risk factor for the device risk engine from the record of device posture information, and including the new risk factor as a risk factor in the device risk engine.

9. The method of claim 6, wherein at least one sequence of auxiliary bits includes a silent alarm, the silent alarm indicating whether the mobile device has been subjected to suspected malicious activity.

10. The method of claim 9, further comprising counting a number of times the silent alarm is triggered across multiple logins of the user to provide a silent alarm count, and providing the silent alarm count to the device risk engine for use in generating the device risk score.

11. The method of claim 10, wherein the weights of the different risk factors are further adjustable in response to changes in the silent alarm count.

12. The method of claim 11, wherein applying the token code and the device posture information in authenticating the user to the remote network further includes providing the device risk score to a device policy engine, and selectively allowing, by the device policy engine, authentication of the user based on the device risk score.

13. The method of claim 12, wherein applying the token code and the device posture information in authenticating the user to the remote network further includes the device policy engine selectively authorizing access of the user to different resources on the remote network based on the device posture information.

14. The method of claim 12, further comprising providing the silent alarm count to the device policy engine for selectively authorizing access of the user to different resources on the remote network based on the silent alarm count.

15. The method of claim 12, wherein the device posture information includes a geographic location of the mobile device and wherein the method further includes at least one of (i) the device policy engine prohibiting users from accessing the remote network from a predetermined set of geographic locations and (ii) the device policy engine directing user access for users in particular geographic locations to the remote network through a server configured to monitor user activities.

16. The method of claim 1, wherein the mobile device includes a local risk engine for generating a local risk score, wherein the local risk score is conveyed to the device risk engine in the record of device posture information, and wherein generating the device risk score is based at least on part on the local risk score from the mobile device.

17. The method of claim 1, wherein applying the token code and the device posture information in authenticating the user to the remote network further includes:
providing a second risk engine for generating a second risk score, the second risk score based on (i) a set of information not obtained from the mobile device and (ii) a set of information from the mobile device that overlaps in content with the set of information not obtained from the mobile device; and
identifying contradictions between (i) the set of information not obtained from the mobile device and (ii) the set of information from the mobile device that overlaps in content with the set of information not obtained from the mobile device.

18. The method of claim 17, wherein applying the token code and the device posture information in authenticating the user to the remote network further includes combining the second risk score from the second risk engine with the device risk score from the device risk engine to generate a total risk score.

19. The method of claim 1, wherein the token code is a one-time password and is one of a sequence of token codes generated at regular intervals, and wherein receiving the token code takes place in response to the token code being transferred from the mobile device to the computing machine.

20. The method of claim 19, further comprising reversing a blending operation whereby the mobile device blends token codes with portions of device posture information.

21. A server, comprising:
a set of processors; and
memory, coupled to the set of processors, the memory constructed and arranged to store instructions executable by the set of processors,
wherein the set of processors executing instructions from the memory forms a specialized circuit for managing access of a user of a computing machine to a remote network, the specialized circuit constructed and arranged to:
receive, from the computing machine, a token code generated by a mobile device that runs a soft token;
receive device posture information collected by and pertaining to the mobile device; and
apply the token code and the device posture information in authenticating the user to the remote network,
wherein the specialized circuit is constructed and arranged to receive the token code in the form of a passcode that includes the token code combined with a sequence of auxiliary bits that convey device posture information,
wherein the specialized circuitry is further constructed and arranged to aggregate sequences of auxiliary bits obtained through multiple login attempts to assemble a record of device posture information, and
wherein the specialized circuitry is constructed and arranged to receive the token code in response to (i) the mobile device displaying the token code and (ii) a user of the mobile device manually transferring the token code from the mobile device to the computing machine.

22. A non-transitory computer readable medium including instructions which, when executed by a set of processors of a server, cause the set of processors to perform a method of managing access of a user of a computing machine to a remote network, the method comprising:
receiving, from the computing machine, a token code generated by a mobile device that runs a soft token;
receiving device posture information collected by and pertaining to the mobile device; and
applying the token code and the device posture information in authenticating the user to the remote network,
wherein the token code is received in the form of a passcode that includes the token code combined with a sequence of auxiliary bits that convey device posture information,
wherein receiving the token code takes dace in response to (i) the mobile device displaying the token code and (ii) a user of the mobile device manually transferring the token code from the mobile device to the computing machine, and
wherein the method further comprises aggregating sequences of auxiliary bits obtained through multiple login attempts to assemble a record of device posture information.

* * * * *